United States Patent
Li et al.

(10) Patent No.: US 12,273,942 B2
(45) Date of Patent: Apr. 8, 2025

(54) INFORMATION CONFIGURATION METHOD FOR DISPLAY APPARATUS, AND DISPLAY APPARATUS

(71) Applicant: BOE Technology Group Co., Ltd., Beijing (CN)

(72) Inventors: Jinlei Li, Beijing (CN); Yao Wang, Beijing (CN); Quanzhong Wang, Beijing (CN); Tieli Chen, Beijing (CN); Hui Qiao, Beijing (CN); Hu Zhu, Beijing (CN); Xinxin Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 75 days.

(21) Appl. No.: 17/788,152

(22) PCT Filed: Aug. 16, 2021

(86) PCT No.: PCT/CN2021/112653
§ 371 (c)(1),
(2) Date: Jun. 22, 2022

(87) PCT Pub. No.: WO2022/068425
PCT Pub. Date: Apr. 7, 2022

(65) Prior Publication Data
US 2023/0337298 A1 Oct. 19, 2023

(30) Foreign Application Priority Data
Sep. 30, 2020 (CN) .......................... 202011057169.2

(51) Int. Cl.
*H04W 76/14* (2018.01)
*G06F 9/4401* (2018.01)
(Continued)

(52) U.S. Cl.
CPC .......... *H04W 76/14* (2018.02); *G06F 9/4418* (2013.01); *H04W 4/80* (2018.02); *H04W 12/06* (2013.01)

(58) Field of Classification Search
CPC ....... H04W 76/14; H04W 4/80; H04W 12/06; H04W 76/40; G06F 9/4418; G06F 9/4411; H04M 1/72454
See application file for complete search history.

(56) References Cited

U.S. PATENT DOCUMENTS 9,111,402 B1 8/2015 Krishnan et al.
2008/0161101 A1* 7/2008 Lutnick .................. G07F 17/32
463/25
(Continued)

FOREIGN PATENT DOCUMENTS

CN 102185842 A 9/2011
CN 103491655 A * 1/2014
(Continued)

OTHER PUBLICATIONS

PCT/CN2021/112653 international search report and written opinion.
CN 202011057169.2 first office action dated Sep. 25, 2024.

*Primary Examiner* — Umair Ahsan
(74) *Attorney, Agent, or Firm* — IPro, PLLC (57) ABSTRACT

Information configuration method for display apparatus, and display apparatus are provided. The display apparatus includes display and communication modules, and the information configuration method for the display apparatus includes: obtaining environmental information where the display apparatus is located; determining, by the communication module, a communication mode matching with the environment information, receiving target information sent by a server; and displaying, by the display module, target content corresponding to the target information. According (Continued)

to the display apparatus, information required to be displayed can be display by the display module, and by displaying different information, the display apparatus can be reused, thereby reducing waste. In addition, information is sent to the display apparatus in different communication modes according to the environment information of the display apparatus, which can improve the timeliness and convenience of updating information in the display apparatus and improve use experiences.

14 Claims, 1 Drawing Sheet

(51) Int. Cl.
*H04W 4/80* (2018.01)
*H04W 12/06* (2021.01)

(56) References Cited

U.S. PATENT DOCUMENTS

| | | | |
|---|---|---|---|
| 2015/0038087 A1* | 2/2015 | Park | H04W 76/14 |
| | | | 455/41.3 |
| 2015/0103708 A1 | 4/2015 | Kang et al. | |
| 2015/0339654 A1* | 11/2015 | Warner | G07F 17/42 |
| | | | 463/25 |
| 2017/0256108 A1* | 9/2017 | Ci | G07C 9/257 |
| 2018/0278728 A1* | 9/2018 | Kongovi | H04L 69/24 |
| 2019/0289655 A1* | 9/2019 | Zhao | H04B 5/48 |

FOREIGN PATENT DOCUMENTS

| | | |
|---|---|---|
| CN | 105631956 A | 6/2016 |
| CN | 208225411 U | 12/2018 |
| CN | 110166967 A | 8/2019 |
| CN | 110210598 A | 9/2019 |
| CN | 110489961 A | 11/2019 |
| CN | 209625261 U | 11/2019 |

* cited by examiner

INFORMATION CONFIGURATION METHOD FOR DISPLAY APPARATUS, AND DISPLAY APPARATUS

CROSS-REFERENCE TO RELATED APPLICATIONS

The present application is the U.S. national phase of PCT Application No. PCT/CN2021/112653 filed on Aug. 16, 2021, which claims priority to Chinese Patent Application No. 202011057169.2 filed in China on Sep. 30, 2020, the disclosure of which is hereby incorporated by reference in its entirety.

TECHNICAL FIELD

The present disclosure relates to the technical field of Internet of Things, and in particular, to an information configuration method for a display apparatus, and a display apparatus.

BACKGROUND

In meetings, events, large sport meetings such as the Olympic Games, an identity registration card is provided for the participant to facilitate manpower management and coordination. In the related art, the participant is usually provided with an identity registration card, and during the production process for the card, a photo is usually required to be provided, and operations such as printing and plastic packaging for the card are further performed for the production of the identity registration card. However, such an identity registration card can be used only once, which is inconvenient for reusing, and may cause a lot of pollution and waste.

SUMMARY

Embodiments of the present disclosure provide an information configuration method for a display apparatus, and a display apparatus to address the issue that conventional paper cards are inconvenient to use and may cause a lot of pollution and waste.

In a first aspect, an embodiment of the present disclosure provides an information configuration method for a display apparatus, the display apparatus including a display module and a communication module, the method including the following steps:

obtaining environmental information where the display apparatus is located;

determining, by the communication module, a communication mode matching with the environment information, and receiving target information sent by a server with the matching communication mode; and displaying, by the display module, a target content corresponding to the target information.

In some embodiments, the communication module includes a Bluetooth sub-module and a mobile data sub-module, and the step of determining, by the communication module, the communication mode matching with the environment information, and receiving the target information sent by the server with the matching communication mode, includes:

periodically sending, by the Bluetooth sub-module, broadcast information;

in a case where the Bluetooth sub-module receives feedback information, controlling the mobile data sub-module to stay in a dormant state, and receiving, by the Bluetooth sub-module, the target information, wherein the feedback information is generated and sent by a Bluetooth hotspot according to the broadcast information; and in a case where the Bluetooth sub-module does not receive the feedback information, waking up the mobile data sub-module, and receiving, by the mobile data sub-module, the target information.

In some embodiments, the step of waking up the mobile data sub-module, and receiving, by the mobile data sub-module, the target information, includes:

periodically waking up the mobile data sub-module, and establishing, by the mobile data sub-module, a heartbeat connection with the server when the mobile data sub-module is in a wake-up state; and in a case where the heartbeat connection is established between the mobile data sub-module and the server, receiving, by the mobile data receiving sub-module, short packet data sent by the server.

In some embodiments, the communication module further includes a near field communication sub-module, the target information includes a link address of first information, and after the step of determining, by the communication module, the communication mode matching with the environment information, and receiving the target information sent by the server with the matching communication mode, the method further includes:

in a case where the display apparatus establishes a communication connection with a target electronic device by the near field communication sub-module, sending, by the near field communication sub-module, the link address included in the short packet data to the target electronic device for accessing the first information by the target electronic device with the link address.

In some embodiments, the communication module includes a wired transmission sub-module, and the step of determining, by the communication module, the communication mode matching with the environment information, and receiving the target information sent by the server with the matching communication mode, includes:

receiving, by the wired transmission sub-module, the target information sent by the server.

In some embodiments, the environment information is that the display apparatus is in an environment for registration and/or activation, and the target information includes identity registration information; and the step of determining, by the communication module, the communication mode matching with the environment information, and receiving the target information sent by the server with the matching communication mode, includes:

when the display apparatus is in registration and/or activation, receiving, by the wired transmission sub-module, the identity registration information sent by the server.

In some embodiments, the display module includes an ink screen, and the step of displaying, by the display module, the target content corresponding to the target information, includes:

displaying user identity information contained in the identity registration information in a preset area of the ink screen.

In some embodiments, after the step of receiving, by the wired transmission sub-module, the identity registration information sent by the server, the method further includes:

receiving authorization information sent by the server;

displaying the authorization information on the ink screen when a permission period corresponding to the authorization information is not expired; and clearing a content displayed on the ink screen and clearing data related to the authorization information in the display apparatus in a case where the permission period corresponding to the authorization information is expired.

In a second aspect, an embodiment of the present disclosure provides a display apparatus including a display module and a communication module, the display apparatus including:

an obtaining module, configured for obtaining environment information where the display apparatus is located;

a receiving module, configured for determining, by the communication module, a communication mode matching with the environment information, and receiving target information sent by a server with the matching communication mode; and the display module, configured for displaying a target content corresponding to the target information.

In some embodiments, the communication module includes a Bluetooth sub-module and a mobile data sub-module, and the receiving module includes:

a broadcast sub-module, configured for periodically sending, by the Bluetooth sub-module, broadcast information;

a receiving sub-module, configured for, in a case where the Bluetooth sub-module receives feedback information, controlling the mobile data sub-module to stay in a dormant state, and receiving the target information through the Bluetooth sub-module, wherein the feedback information is generated and sent by a Bluetooth hotspot according to the broadcast information; and a wake-up sub-module, configured for, in a case where the Bluetooth sub-module does not receive the feedback information, waking up the mobile data sub-module, and receiving the target information through the mobile data sub-module.

The display apparatus provided by the embodiments of the present disclosure includes the display module and the communication module. Information can be obtained by the communication module, and relevant information can be displayed by the display module. Further, in the embodiments of the present disclosure, environmental information about the location of the display apparatus is obtained; the communication module determines a communication mode matching with the environment information, and target information sent by a server is received with the matching communication mode; then the display module can display a target content corresponding to the target information. Thus, according to the display apparatus provided by the embodiments of the present disclosure, information to be displayed can be display by the display module, and by displaying different information, the display apparatus can be reused, thereby reducing waste. Moreover, in the embodiments, information can be sent to the display apparatus with different communication modes according to the environment information of the display apparatus, which can improve the timeliness and convenience of updating information in the display apparatus and is advantageous for improving user experiences.

BRIEF DESCRIPTION OF THE DRAWINGS

To illustrate the technical solutions of embodiments of the present disclosure more clearly, a brief description will be given below with reference to the accompanying drawings used for describing the embodiments of the present disclosure. Apparently, the drawings described below are only some embodiments of the present disclosure, and other drawings can be obtained by those skilled in the art according to these drawings without involving any creative effort.

DETAILED DESCRIPTION

Embodiments of the present disclosure will now be described more clearly hereinafter with reference to the accompanying drawings, in which some, but not all embodiments of the disclosure are described. Based on the embodiments of the present disclosure, all other embodiments obtained by a person of ordinary skill in the art without creative effort fall within the scope of the present disclosure.

An embodiment of the present disclosure provides an information configuration method for a display apparatus.

In this embodiment, the display apparatus includes a display module and a communication module, in which the display module at least includes a display screen for displaying information required to be presented by the display apparatus via the display screen, and the display apparatus further includes the communication module, and the communication module is configured for providing a communication connection for updating information stored in the display apparatus. In addition, some other functional modules may be included in the display apparatus, such as a processor, memory, power supply, etc.

In an embodiment, the display apparatus may be an identity card, e.g., may be used as an identity registration card for an athlete or a staff member in a sports meeting, or as a participant identity card for a participant in a large meeting, etc.

Figure 1:
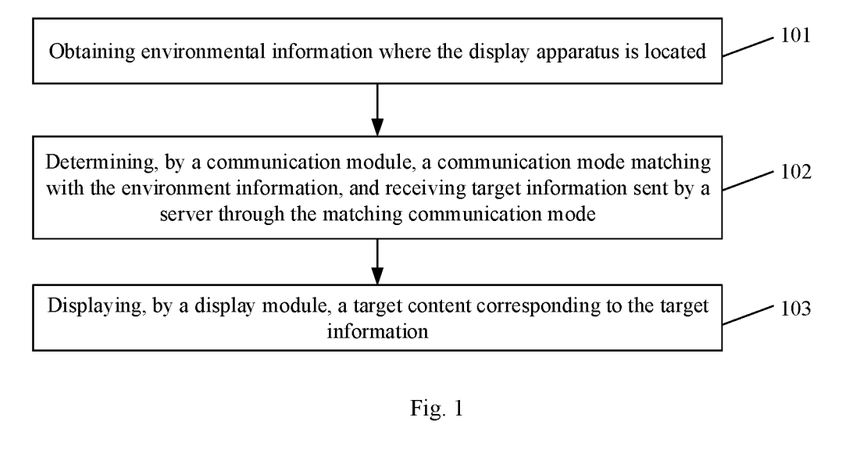
FIG. 1 is a flowchart of an information configuration method for a display apparatus according to an embodiment of the present disclosure.

As shown in FIG. 1, in an embodiment of the present disclosure, the information configuration method for the display apparatus includes the following steps.

In step 101, environment information where the display apparatus is located is obtained.

In this embodiment, the environment information of the display apparatus refers to the usage scenario of the display apparatus, and may also be the usage environment of the display apparatus.

It should be understood that the usage scenario of the display apparatus refers to registration and/or activation, identity authentication, and other usage scenarios of the display apparatus. The usage environment refers to different usage environments, which may include indoor, outdoor, etc.

The display apparatus is further described by way of an example in which an identity registration card for use by a person during a sports meeting. Each identity registration card is initially a blank identity registration card that does not include identity information.

In use, the card needs to be prepared firstly, and after the card preparation is completed, the card may further need to be swiped as a passport certificate for entering a specific area. When the user carries the identity registration card, a message may also be pushed to the holder of the display apparatus by the identity registration card. The user may be located at different positions such as indoor or outdoor positions, and the above-mentioned different conditions may all be referred to as environment information of the identity registration card.

In step 102, a communication mode matching with the environment information is determined by the communication module, and target information sent by a server is received with the matching communication mode.

In embodiments of the present disclosure, the communication module may provide a plurality of different communication modes so as to be adapted to different environmental information. The target information sent by the server may be received via different communication modes under different environmental information, so as to match to different usage environments and improve applicability.

For example, when registering and activating the identity registration card, data may be transmitted via a non-contact near field communication mode or via a data line connection. For another example, when the identity registration card is located at an outdoor position, the communication connection between the identity registration card and the server may be provided via a mobile data network, while the identity registration card is located at an indoor environment, the communication connection between the identity registration card and the server may be provided via a wireless hotspot.

In implementation, the communication mode that can be established is determined by the communication module, and the connection mode that can be established is related to the environment information of the identity registration card.

After the communication mode matching with the environment information is determined, the identity registration card obtains the target information from the server based on the communication mode.

It step 10, a target content corresponding to the target information is displayed by the display module.

After the target information is obtained, the corresponding target content is displayed on the display apparatus through the display module. For example, for an athlete, the athlete's identity information, address, the event(s) that he/she participates in and other relevant content may be displayed on the identity registration card. Furthermore, the target content may also include information such as an event notification and an event arrangement.

According to the display apparatus provided by the embodiments of the present disclosure, information to be displayed can be displayed by the display module, and the display apparatus can be reused by displaying different information, thereby reducing waste. In addition, in the embodiments, information can be sent to the display apparatus with different communication modes according to the environment information of the display apparatus, which can improve the timeliness and convenience of updating information in the display apparatus and is advantageous for improving user experiences.

In some embodiments, the communication module includes a Bluetooth sub-module and a mobile data sub-module, and the step of determining the communication mode matching with the environment information by the communication module, and receiving the target information sent by the server with the matching communication mode, includes:

periodically sending broadcast information by the Bluetooth sub-module;

in a case where the Bluetooth sub-module receives feedback information, controlling the mobile data sub-module to stay in a dormant state, and receiving the target information through the Bluetooth sub-module, where the feedback information is generated and sent by a Bluetooth hotspot according to the broadcast information; and in a case where the Bluetooth sub-module does not receive the feedback information, waking up the mobile data sub-module, and receiving the target information through the mobile data sub-module.

In this embodiment, the communication module includes the Bluetooth sub-module and the mobile data sub-module. In practical use, the Bluetooth sub-module with relatively low power consumption is used first for data communications. In implementation, broadcast information is periodically sent by the Bluetooth sub-module, and in a designated area which is covered by the Bluetooth hotspot, the Bluetooth hotspot may receive the corresponding broadcast information, and then return feedback information.

Sending broadcast information by the display apparatus to the Bluetooth hotspot is to enable the server to determine that the display apparatus is in a state capable of being communicated, and to enable the server to roughly positioning the position of the display apparatus by the Bluetooth hotspot to which the display apparatus is connected, so as to facilitate further sorting and statistics on the user flow information. For example, it is possible to determine the pedestrian flow and visitor distribution for each area according to the broadcast information which can be received by the Bluetooth hotspot of that area, and it is also possible to obtain pedestrian flow data for different time periods by statistics on the broadcast information of different time periods.

If the display apparatus can receive the feedback information returned by the Bluetooth hotspot, the current position of the display apparatus is within the coverage range of the Bluetooth hotspot. Then, the communication connection between the display apparatus and the server is provided via Bluetooth with lower power consumption, and at the same time, the mobile data sub-module is controlled to be in the dormant state so as to further reduce the power consumption of the display apparatus.

If the display apparatus cannot receive the feedback information returned by the Bluetooth hotspot, the display apparatus is located in an area which cannot be covered by the Bluetooth hotspot, such as an outdoor position. In such case, the mobile data sub-module is woken up, and a communication connection with the server is established via the mobile data sub-module so as to receive the target information.

The process of the mobile data sub-module establishing a communication connection with the server may include: the mobile data sub-module uploads a heartbeat packet to the server via a network operator base station (for example, a 4G/5G base station), and when the server has data to be sent, the data is sent via the network operator base station in a heartbeat process.

When there is a target message sent by the server on the display apparatus, the presence of the target message may be prompted by means of a vibration, an indicator light, or displaying a notification message in a specific area.

In some embodiments, the step of waking up the mobile data sub-module, and receiving the target information through the mobile data sub-module, includes:

periodically waking up the mobile data sub-module, and establishing a heartbeat connection to the server with the mobile data sub-module when the mobile data sub-module is in a wake-up state; and in a case where the heartbeat connection is established between the mobile data sub-module and the server, receiving short packet data sent by the server through the mobile data receiving sub-module.

It should be understood that a battery having a large weight cannot be used in the display apparatus due to factors such as the size, weight of the display apparatus, and therefore, further reducing the power consumption of the display apparatus may be advantageous.

In this embodiment, by periodically waking up the mobile data sub-module and allowing the mobile data sub-module to be stay in the dormant state most of the time, it is advantageous for reducing the power consumption of the display apparatus and prolonging the usage time.

Furthermore, in this embodiment, the data connection enabled by the mobile data sub-module may only support a Narrow Band Internet of Things (NB-IoT), and NB-IoT refers to a mobile data connection manner supporting only short packet data. NB-IoT has a relatively small bandwidth and only supports the transmission of short packet data, but is advantageous for further reducing the power consumption of the display apparatus.

In some embodiments, the communication module further includes a near field communication sub-module (NFC sub-module), the target information includes a link address of first information, and after the step of determining the communication mode matching with the environment information by the communication module, and receiving the target information sent by the server with the matching communication mode, the method further includes:

in a case where the display apparatus establishes a communication connection with a target electronic device by the NFC sub-module, sending the link address included in the short packet data by the NFC sub-module to the target electronic device for accessing the first information by the target electronic device with the link address.

Further, since only the transferring of the short packet data is supported due to the limited bandwidth of the NB-IoT, the display apparatus in this embodiment obtains only the link address of the first information from the server.

When the user needs to access the first information, the target electronic device such as a mobile phone is used to establish a connection with the display apparatus by the NFC sub-module, and the link address transmitted in a specific format by the display apparatus based on the NFC sub-module is received by the target electronic device.

After the link address is obtained, the target electronic device accesses the link address based on a network accessing manner that the target electronic device is capable of implementing, thereby accessing to the first information.

In this process, the display apparatus transmits data only by a data transmission mode with a low power consumption such as NB-IoT and NFC, and the content to be transmitted is the link address, so that the amount of data to be transmitted is less, which is in favor of further reducing the power consumption of the display apparatus and thus prolonging the usage time of the display apparatus.

In some embodiments, the communication module includes a wired transmission sub-module, and the step of determining the communication mode matching with the environment information by the communication module, and receiving the target information sent by the server with the matching communication mode, includes:

receiving the target information sent by the server through the wired transmission sub-module.

In this embodiment, a data interface, such as a Universal Serial Bus (USB) data interface, may also be provided on the display apparatus for wired data transferring.

Specifically, in an embodiment, the environment information is that the display apparatus is in an environment for registration and/or activation, and the target information includes identity registration information.

The step of determining the communication mode matching with the environment information by the communication module, and receiving the target information sent by the server with the matching communication mode, includes:

when registering and/or activating the display apparatus, receiving the identity registration information sent by the server through the wired transmission sub-module.

The registration process of the display apparatus is further described in this embodiment.

Further, in an embodiment, the display apparatus may be activated and/or or registered at a specific location. For example, an identity registration card of an athlete is activated and/or or registered in an athlete registration center. For another example, a temporary identity card issued to a temporary user such as a temporary staff member, a visitor and the like is registered in a visitor center.

In the registration process, the staff first sends a registration request to the server according to the identity information provided by the registrant. Specifically, for example, the registration request may be sent by a computer or a specific terminal device, and the server sends the identity registration information to the computer or the specific terminal device according to the registration request. In this process, a blank identity registration card may be connected to the above-mentioned computer or specific terminal through a data line, which can improve the data transmission speed and data transmission stability.

It should be understood that in other embodiments, when registering and/or activating the display apparatus, wireless data transmission as described above including but not limited to Bluetooth, mobile data network or NFC, may be used. For example, the identity registration card may be communicatively connected to the computer or the specific terminal by using a contactless card reader, to receive the identity registration information sent by the server through the computer or the specific terminal.

Further, according to the identity registration information, the target content is displayed on the display apparatus, and the target content may include identity information about the registrant, for example, relevant information such as name, gender, age, nationality, event(s) he/she participates in, visitor permission and the like. The target content may also include some other contents, such as date, sign of sports meetings, stadium map and the like. Such information may be directly displayed in characters, or indirectly provided in image information such as bar code and two-dimensional code. In this way, the registration and card preparation of the identity registration card is completed.

For a display apparatus that have been registered and activated, it is also possible to further update and push relevant messages such as stadium information related to the display apparatus, and to further update the relevant messages when an adjustment relating to these messages takes place, e.g., an adjustment on the time of the event.

In some embodiments, the display module includes an ink screen, and the step of displaying the target content corresponding to the target information by the display module, includes:

displaying user identity information contained in the identity registration information in a preset area of the ink screen.

It should be understood that parameters, such as weight, volume and the like, of the display apparatus cannot be large for convenience, and therefore, a relatively large battery cannot be used in the display apparatus. It is also important to reduce the power consumption of the display apparatus when it is in use.

In this embodiment, the ink screen (or referred to as an electronic paper display technology) is used as a display screen. The ink screen does not consume power when displaying content. The ink screen consumes power only in the process of switching the displayed content, and can keep the displayed content unchanged even in a power-off state. Therefore, in this embodiment, the ink screen is used as the display screen, which may specifically be a black and white ink screen, and more suitably, a color ink screen.

By using the ink screen as the display screen, it is possible to reduce the power consumption of the display apparatus, prolong the usage time thereof, and ensure that the content required to be displayed continues to be displayed even if the battery power of the display apparatus is exhausted. In this way, the display apparatus has a higher applicability In some embodiments, after the step of receiving the identity registration information sent by the server through the wired transmission sub-module or the near field communication sub-module, the method further includes:
  receiving authorization information sent by the server;
  displaying corresponding authorization information on the ink screen when a permission period corresponding to the authorization information is not expired; and
  in a case where the permission period corresponding to the authorization information expires, clearing the content displayed on the ink screen, and clearing data related to the authorization information in the display apparatus.

Different access permission may be provided for different users, e.g., a visitor may be only allowed to enter a specified area and there may be limitations on his/her visiting time.

In this embodiment, after the server sends the identity registration information to the display apparatus, the authorization information is further added to the display apparatus, and the authorization information include at least an authorized scope and an authorized time.

For example, if a certain temporary authorization only allows a visitor A to access an M area, and the valid time therefor is two hours, then within the authorized time range, permission information on allowing accessing to the M area is displayed on the display apparatus, which may specifically be characters, or may be a bar code so that the visitor A obtains the permission to access to the M area by scanning the code.

In a case where the authorization time is expired, the relevant permission information on the display apparatus is cleared, so that the visitor A cannot enter the M area through the display apparatus. In addition, the data related to the authorization information in the display apparatus may be further cleared.

For example, if the display apparatus is held by the visitor A himself/herself, and the permission to access to the M area is temporarily applied by the visitor A, only the permission related to access to the M area is cleared. If the display apparatus is a temporarily applied display apparatus for the visitor A accessing to the M area, all the information in the display apparatus may be cleared. In this case, the display apparatus may be retrieved by the staff, or the display apparatus may be in a designated retrieval area by the visitor A, for subsequent reuses of the display apparatus.

It will be appreciated that each display apparatus in this embodiment has its unique identity, such as a particular device code or static key etc. In the process of information transmission, the information may be further encrypted to improve the security of the information. With regard to the hardware device of the display apparatus, an anti-destroy apparatus may be further provided or an encryption chip may be used. For example, a data formatting may be performed on data in the display apparatus to protect data security when an illegal data reading is detected.

With regard to the data encryption process, the target information sent by the server to the display apparatus may be encrypted through an asymmetric algorithm, with the encryption public key maintained in the display apparatus, and the encryption private key stored in the server. When data need to be sent, the target information is encrypted with the encryption private key. In the display apparatus, the target information is decrypted with the encryption public key, and additionally, the security of the information is further ensured through information check.

The above-mentioned server may be a cloud server, for example, the management client of the display apparatus may be established based on a specific local area network, and the local area network is communicatively connected to the cloud server via a dedicated line so as to further improve the security level of data and reduce the possibility of data leakage.

Figure 2:
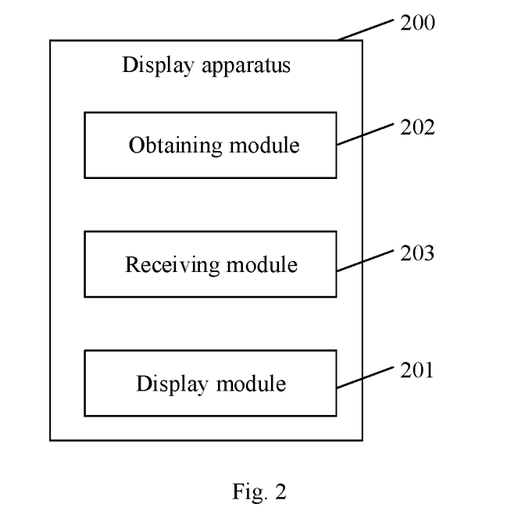
FIG. 2 is a block diagram of a display apparatus provided by an embodiment of the present disclosure.

An embodiment of the present disclosure further provides a display apparatus, including a display module 201 and a communication module, and the display apparatus 200 includes:
  an obtaining module 202, configured for obtaining environment information where the display apparatus is located;
  a receiving module 203, configured for determining, by the communication module, a communication mode matching with the environment information, and receiving target information sent by a server with the matching communication mode; and
  the display module 201, configured for displaying a target content corresponding to the target information.

In some embodiments, the communication module includes a Bluetooth sub-module and a mobile data sub-module, and the receiving module 203 includes:
  a broadcast sub-module, configured for periodically sending, by the Bluetooth sub-module, broadcast information;
  a receiving sub-module, configured for, in a case where the Bluetooth sub-module receives feedback information, controlling the mobile data sub-module to stay in a dormant state, and receiving, by the Bluetooth sub-module, the target information, wherein the feedback information is generated and sent by a Bluetooth hotspot according to the broadcast information; and
  a wake-up sub-module, configured for in a case where the Bluetooth sub-module does not receive the feedback information, waking up the mobile data sub-module, and receiving, by the mobile data sub-module, the target information.

In some embodiments, the wake-up module includes:
  a wake-up unit, configured for periodically waking up the mobile data sub-module, and establishing, by the mobile data sub-module, a heartbeat connection with the server when the mobile data sub-module is in a wake-up state; and a receiving unit, configured for, in a case where the heartbeat connection is established between the mobile data sub-module and the server, receiving, by the mobile data receiving sub-module, short packet data sent by the server.

In some embodiments, the communication module further includes a near field communication sub-module, the target information includes a link address of first information, and further includes:

a link address sending module, configured for, in a case where the display apparatus establishes a communication connection with a target electronic device by the near field communication sub-module, sending, by the near field communication sub-module, the link address included in the short packet data to the target electronic device to cause the target electronic device to access the first information with the link address.

In some embodiments, the communication module includes a wired transmission sub-module; and the receiving module 203 is specifically configured for receiving, by the wired transmission sub-module, the target information sent by the server.

In some embodiments, the environment information is that the display apparatus is in an environment for registration and/or activation, and the target information includes identity registration information; and the receiving module 203 is specifically configured for receiving, by the wired transmission sub-module, the identity registration information sent by the server when registering and/or activating the display apparatus.

In some embodiments, the display module 201 includes an ink screen, and the display module 201 is specifically configured for displaying user identity information included in the identity registration information in a preset area of the ink screen.

In some embodiments, the following modules is further included:

an authorization information receiving module, configured for receiving authorization information sent by the server; and the display module 201 is further configured for displaying the authorization information on the ink screen when a permission period corresponding to the authorization information is not expired; and the display module 201 is further configured for clearing a content displayed on the ink screen and clearing data related to the authorization information in the display apparatus when the permission period corresponding to the authorization information is expired.

The display apparatus 200 of this embodiment is capable of realizing various steps of the information configuration method for the display apparatus according to the embodiments shown in FIG. 1, and achieving substantially the same or similar technical effects, which will not be described in detail herein.

While the present disclosure has been described with reference to specific embodiments thereof, it will be understood that various changes may be made and equivalents may be substituted for elements thereof by those skilled in the art without departing from the scope of the disclosure. Accordingly, the protection sought herein is as set forth in the claims below.

What is claimed is:

1. An information configuration method for a display apparatus, the display apparatus comprising a display module and a communication module, the method comprising the following steps:

obtaining environmental information where the display apparatus is located;

determining, by the communication module, a communication mode matching with the environment information, and receiving target information sent by a server with the matching communication mode; and displaying, by the display module, a target content corresponding to the target information;

wherein the communication module comprises a Bluetooth sub-module and a mobile data sub-module, and the step of determining, by the communication module, the communication mode matching with the environment information, and receiving the target information sent by the server with the matching communication mode, comprises:

periodically sending, by the Bluetooth sub-module, broadcast information;

in a case where the Bluetooth sub-module receives feedback information, controlling the mobile data sub-module to stay in a dormant state, and receiving, by the Bluetooth sub-module, the target information, wherein the feedback information is generated and sent by a Bluetooth hotspot according to the broadcast information; and in a case where the Bluetooth sub-module does not receive the feedback information, waking up the mobile data sub-module, and receiving, by the mobile data sub-module, the target information.

2. The method according to claim 1, wherein the step of waking up the mobile data sub-module, and receiving, by the mobile data sub-module, the target information, comprises:

periodically waking up the mobile data sub-module, and establishing, by the mobile data sub-module, a heartbeat connection with the server when the mobile data sub-module is in a wake-up state; and in a case where the heartbeat connection is established between the mobile data sub-module and the server, receiving, by a mobile data receiving sub-module, short packet data sent by the server.

3. The method according to claim 1, wherein the communication module further comprises a near field communication sub-module, the target information comprises a link address of first information, and after the step of determining, by the communication module, the communication mode matching with the environment information, and receiving the target information sent by the server with the matching communication mode, the method further comprises:

in a case where the display apparatus establishes a communication connection with a target electronic device by the near field communication sub-module, sending, by the near field communication sub-module, the link address included in short packet data for accessing the first information by the target electronic device with the link address.

4. The method according to claim 1, wherein the communication module comprises a wired transmission sub-module, and the step of determining, by the communication module, the communication mode matching with the environment information, and receiving the target information sent by the server with the matching communication mode, comprises:

receiving, by the wired transmission sub-module, the target information sent by the server.

5. The method according to claim 4, wherein the environment information is that the display apparatus is in an environment for registration and/or activation, and the target information comprises identity registration information; and the step of determining, by the communication module, the communication mode matching with the environment information, and receiving the target information sent by the server with the matching communication mode, comprises:

when the display apparatus is in registration and/or activation, receiving, by the wired transmission sub-module, the identity registration information sent by the server.

6. The method according to claim 5, wherein the display module comprises an ink screen, and the step of displaying, by the display module, the target content corresponding to the target information comprises:

displaying user identity information contained in the identity registration information in a preset area of the ink screen.

7. The method according to claim 6, wherein after the step of receiving, by the wired transmission sub-module, the identity registration information sent by the server, the method further comprises:

receiving authorization information sent by the server;
displaying the authorization information on the ink screen in a case where a permission period corresponding to the authorization information is not expired; and
clearing a content displayed on the ink screen and clearing data related to the authorization information in the display apparatus in a case where the permission period corresponding to the authorization information is expired.

8. A display apparatus, comprising a display module and a communication module, the display apparatus comprising:

a processor and a memory storing instructions, wherein the instructions, when being executed by the processor, implements steps of:

obtaining environmental information where the display apparatus is located;

determining, by the communication module, a communication mode matching with the environment information, and receiving target information sent by a server with the matching communication mode; and displaying, by the display module, a target content corresponding to the target information;

wherein the communication module comprises a Bluetooth sub-module and a mobile data sub-module, and the step of determining, by the communication module, the communication mode matching with the environment information, and receiving the target information sent by the server with the matching communication mode, comprises:

periodically sending, by the Bluetooth sub-module, broadcast information;

in a case where the Bluetooth sub-module receives feedback information, controlling the mobile data sub-module to stay in a dormant state, and receiving, by the Bluetooth sub-module, the target information, wherein the feedback information is generated and sent by a Bluetooth hotspot according to the broadcast information; and in a case where the Bluetooth sub-module does not receive the feedback information, waking up the mobile data sub-module, and receiving, by the mobile data sub-module, the target information.

9. The display apparatus according to claim 8, wherein the step of waking up the mobile data sub-module, and receiving, by the mobile data sub-module, the target information, comprises:

periodically waking up the mobile data sub-module, and establishing, by the mobile data sub-module, a heartbeat connection with the server when the mobile data sub-module is in a wake-up state; and in a case where the heartbeat connection is established between the mobile data sub-module and the server, receiving, by a mobile data receiving sub-module, short packet data sent by the server.

10. The display apparatus according to claim 8, wherein the communication module further comprises a near field communication sub-module, the target information comprises a link address of first information, wherein the instructions, when being executed by the processor, further implement the following step after the step of determining, by the communication module, the communication mode matching with the environment information, and receiving the target information sent by the server with the matching communication mode:

in a case where the display apparatus establishes a communication connection with a target electronic device by the near field communication sub-module, sending, by the near field communication sub-module, the link address included in short packet data for accessing the first information by the target electronic device with the link address.

11. The display apparatus according to claim 8, wherein the communication module comprises a wired transmission sub-module, and the step of determining, by the communication module, the communication mode matching with the environment information, and receiving the target information sent by the server with the matching communication mode, comprises:

receiving, by the wired transmission sub-module, the target information sent by the server.

12. The display apparatus according to claim 11, wherein the environment information is that the display apparatus is in an environment for registration and/or activation, and the target information comprises identity registration information; and the step of determining, by the communication module, the communication mode matching with the environment information, and receiving the target information sent by the server with the matching communication mode, comprises:

when the display apparatus is in registration and/or activation, receiving, by the wired transmission sub-module, the identity registration information sent by the server.

13. The display apparatus according to claim 12, wherein the display module comprises an ink screen, and the step of displaying, by the display module, the target content corresponding to the target information comprises:

displaying user identity information contained in the identity registration information in a preset area of the ink screen.

14. The display apparatus according to claim 13, wherein the instructions, when being executed by the processor, further implement the following steps after the step of receiving, by the wired transmission sub-module, the identity registration information sent by the server:
   receiving authorization information sent by the server;
   displaying the authorization information on the ink screen in a case where a permission period corresponding to the authorization information is not expired; and
   clearing a content displayed on the ink screen and clearing data related to the authorization information in the display apparatus in a case where the permission period corresponding to the authorization information is expired.

\* \* \* \* \*